(12) United States Patent
Nevado et al.

(10) Patent No.: US 10,894,380 B2
(45) Date of Patent: Jan. 19, 2021

(54) COMPOSITE STRUCTURAL COMPONENT AND METHOD OF MAKING SAME

(71) Applicants: Erwin Nevado, Tillsonburg (CA); John Heins, Toronto (CA)

(72) Inventors: Erwin Nevado, Tillsonburg (CA); John Heins, Toronto (CA)

(73) Assignee: Central Graphics and Container Group Ltd., Mississauga (CA)

( * ) Notice: Subject to any disclaimer, the term of this patent is extended or adjusted under 35 U.S.C. 154(b) by 0 days.

(21) Appl. No.: 15/473,253

(22) Filed: Mar. 29, 2017

(65) Prior Publication Data

US 2017/0282485 A1  Oct. 5, 2017

Related U.S. Application Data

(60) Provisional application No. 62/315,713, filed on Mar. 31, 2016.

(51) Int. Cl.
*B32B 3/12* (2006.01)
*B32B 7/12* (2006.01)
(Continued)

(52) U.S. Cl.
CPC .................. *B32B 3/12* (2013.01); *B32B 3/02* (2013.01); *B32B 7/03* (2019.01); *B32B 7/12* (2013.01); *B32B 27/10* (2013.01); *B32B 27/30* (2013.01); *B32B 29/005* (2013.01); *B32B 29/08* (2013.01); *B32B 2250/05* (2013.01); *B32B 2255/12* (2013.01); *B32B 2255/26* (2013.01);
(Continued)

(58) Field of Classification Search
CPC .............. B32B 7/12; B32B 29/08; B32B 3/12
See application file for complete search history.

(56) References Cited

U.S. PATENT DOCUMENTS

| 4,012,276 A | * | 3/1977 | Schertler | ............... B31F 1/2813 |
| | | | | 156/555 |
| 4,989,688 A | * | 2/1991 | Nelson | .................. E04B 1/8227 |
| | | | | 181/286 |

(Continued)

FOREIGN PATENT DOCUMENTS

| GB | 1071132 A | * | 6/1967 | ............ B31F 1/2813 |
| JP | 11280241 A | * | 10/1999 | .............. E04F 15/02 |
| JP | 2015048704 A | * | 3/2015 | |

OTHER PUBLICATIONS

Machine translation of JP 2015048704. Translated by Google on Mar. 29, 2019 JP20150487 (Year: 2015).*

(Continued)

*Primary Examiner* — David Sample
*Assistant Examiner* — Elizabeth Collister
(74) *Attorney, Agent, or Firm* — Head, Johnson, Kachigian & Wilkinson, PC

(57) ABSTRACT

A composite includes a board. The board includes: a pair of corrugated layers, each corrugated layer being formed from two corrugated sheets bonded together; and a cardboard honeycomb disposed between and bonded to the corrugated layers, the honeycomb being orientated such that the cells extend between the corrugated layers. The board can be cut using conventional machinery without fraying [thereby requiring little or no sanding] and can be edgetaped without being crushed using conventional edge taping machinery.

5 Claims, 2 Drawing Sheets

(51) Int. Cl.
  *B32B 29/08* (2006.01)
  *B32B 29/00* (2006.01)
  *B32B 3/02* (2006.01)
  *B32B 27/30* (2006.01)
  *B32B 27/10* (2006.01)
  *B32B 7/03* (2019.01)

(52) U.S. Cl.
  CPC ... *B32B 2260/028* (2013.01); *B32B 2260/046* (2013.01); *B32B 2307/58* (2013.01); *B32B 2307/732* (2013.01); *B32B 2309/105* (2013.01)

(56) References Cited

U.S. PATENT DOCUMENTS

| | | | | |
|---|---|---|---|---|
| 7,749,588 B2* | 7/2010 | Blake | ............. | A47K 13/14 |
| | | | | 108/51.3 |
| 2006/0210777 A1* | 9/2006 | Bauer | ............. | E04C 2/365 |
| | | | | 428/192 |
| 2008/0006367 A1* | 1/2008 | Roberge | ............. | B29C 66/83423 |
| | | | | 156/267 |
| 2010/0196656 A1* | 8/2010 | Leng | ............. | B31D 3/0284 |
| | | | | 428/116 |
| 2013/0000826 A1* | 1/2013 | Katz | ............. | B29B 17/0042 |
| | | | | 156/196 |
| 2013/0071604 A1* | 3/2013 | Lemieux | ............. | B32B 3/02 |
| | | | | 428/71 |
| 2015/0223606 A1* | 8/2015 | Gerstle | ............. | A47C 5/005 |
| | | | | 297/452.1 |

OTHER PUBLICATIONS

Pflug et al. Sandwich Construction: Folded Cardboard and Core Material for Structural Applications, 2000, Proc. ICSC 5, 5th International Conference on Sandwich Construction; 2000 (Year: 2000).*

Jaffe et al., Handbook of Adhesives 3rd edition: Polyvinye Acetate Emulsions for Adhesives, Chapter 21 pp. 381-400. (Year: 1990).*

Tsunagu Japan, 13 Facts You Probably Didn't Know About Tatami, [https://www.tsunagujapan.com/13-facts-you-probably-didnt-know-about-tatami/, accessed Oct. 18, 2019] (Year: 2019).*

* cited by examiner

COMPOSITE STRUCTURAL COMPONENT AND METHOD OF MAKING SAME

CROSS-REFERENCE TO RELATED APPLICATION

This application claims the benefit of U.S. Provisional Patent Application Ser. No. 62/315,713, filed Mar. 31, 2016.

BACKGROUND OF THE INVENTION

1. Field of the Invention

The present disclosure relates generally to a composite structural component.

2. Prior Art

Composite structural components including composite boards utilizing honeycomb centers have been disclosed in the art. However, known composite boards are either relatively difficult to machine, relatively difficult to edge band or relatively costly to produce.

SUMMARY OF THE INVENTION

Forming one aspect of the invention is a composite comprising a board. The board includes: a pair of corrugated layers, each corrugated layer being formed from two corrugated sheets bonded together; and a cardboard honeycomb disposed between and bonded to the corrugated layers, the honeycomb being orientated such that the cells extend between the corrugated layers.

Further advantages and features will become evident upon a review of the detailed description with follows and the appended drawings, the latter being briefly described hereinafter.

DETAILED DESCRIPTION OF THE PREFERRED EMBODIMENTS

Figure 1:
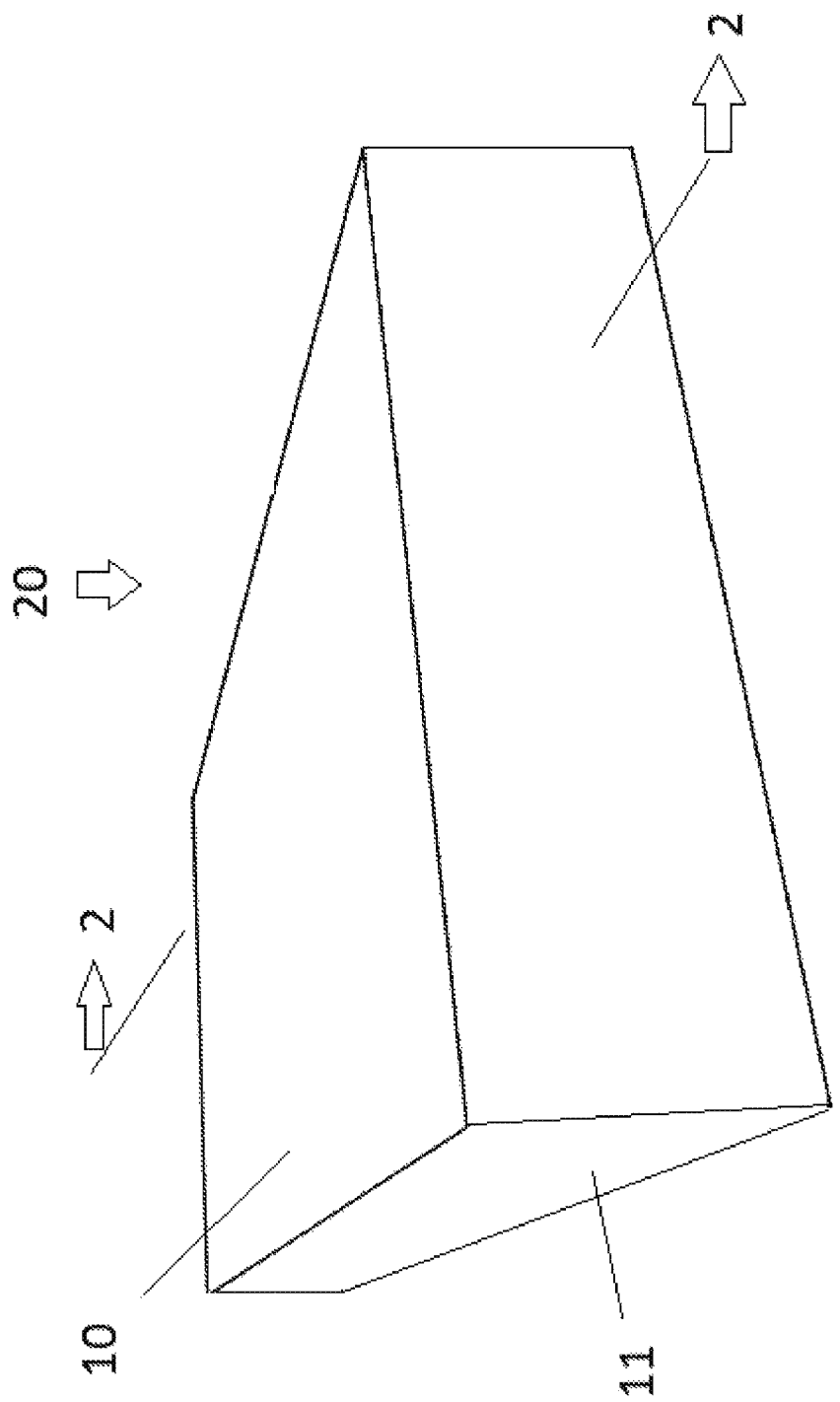
FIG. 1 is a top perspective view of a finished composite component according to one exemplary embodiment of the invention.
Figure 2:
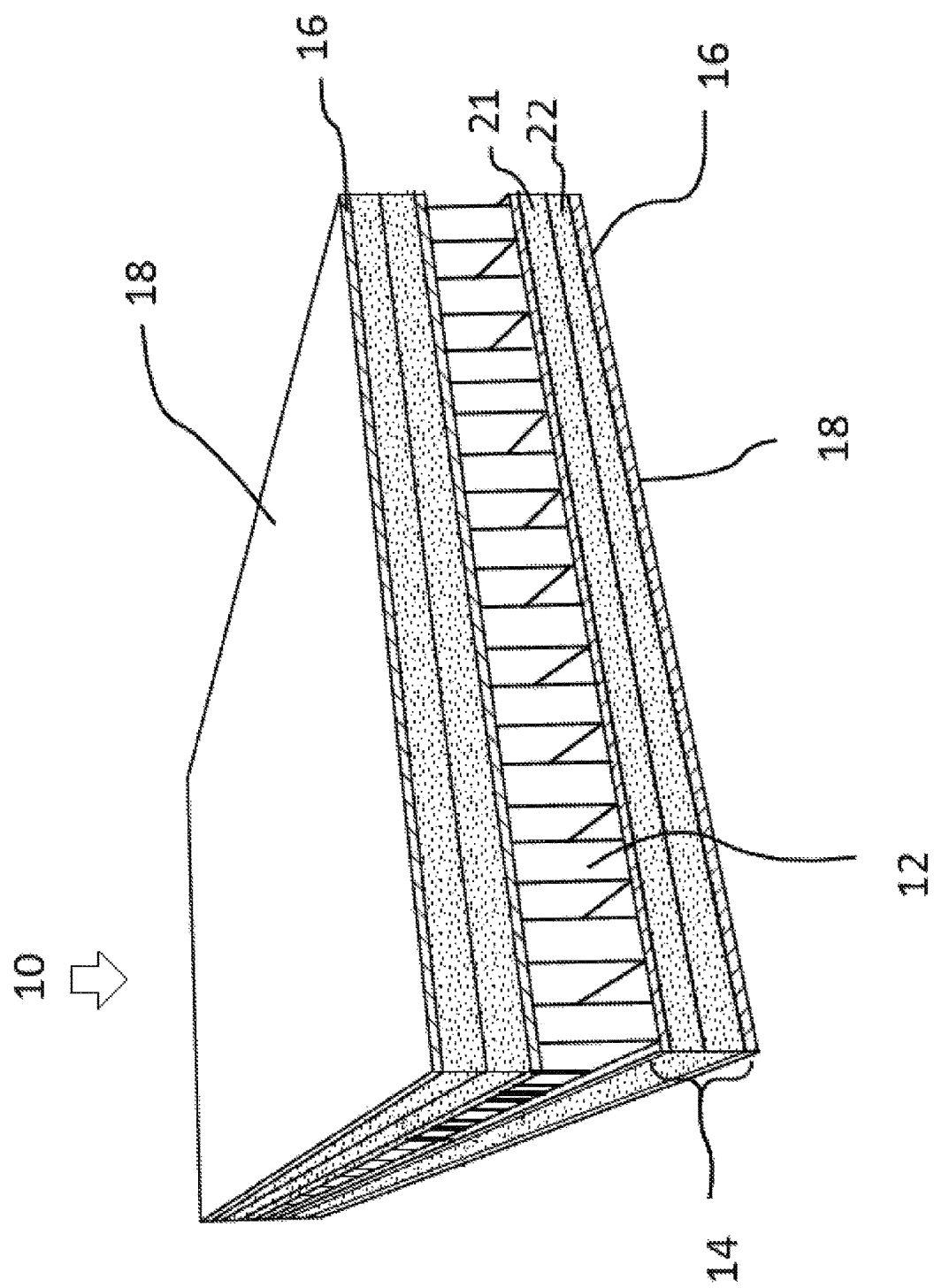
FIG. 2 is a view along 2-2 of FIG. 1.

A composite component 20 which forms an exemplary embodiment of the present invention is hereinafter described with reference to FIGS. 1 and 2.

Composite component 20 will be seen to include a composite board 10 and an edge band 11.

Composite board 10 includes a honeycomb layer 12, a pair of corrugated layers 14 flanking the honeycomb layer 12, a backer layer 16 overlying each corrugated layer and a cover layer 18 overlying each backer layer 16.

Honeycomb layer 12 shown is formed from 0.5" honeycomb sheet from Axxon Packaging.

Each corrugated layer 14 is formed from two EB corrugated sheets bonded together and to the honeycomb layer with PVA glue. [For greater certainty, layer 21 is an E flute layer with a thickness of approximately 0.06" and layer 22 is a B flute layer with a thickness of approximately 0.11].

Each backer layer 16 is formed from a polymer impregnated board, such as Polybak B90™ with a thickness of 0.026", and is bonded to the adjacent corrugated layer 14 with polyvinyl acetate (PVA) glue or adhesive.

Each cover layer 18 is a matte vinyl with a thickness of 0.008" bonded to the corrugated layer with polyvinyl acetate (PVA) glue.

The edge band 11 is made of polyvinyl chloride and surrounds the perimeter of the board 10.

The method of making composite board 10 is described as follows:

- an EB sheet is put through a glue roller applicator to apply a layer of adhesive to produce a coated EB sheet and a further EB sheet is laid upon the coated EB sheet to form an EBBE combination;
- the EBBE combination is passed through a pinch roller to form an EBBE sheet;
- the honeycomb sheet is passed through a double roll glue applicator to apply adhesive on both sides of the honeycomb sheet and is laid upon an EBBE sheet, and a further EBBE is laid upon both, to form an EBBE-honeycomb-EBBE bundle;
- the EBBE bundle is passed through a pinch roller to produce an EBBE sandwich and the EBBE sandwich is placed in a pneumatic pressure for 20 minutes to produce an EBBE board;
- the backer and cover layers are applied in a manner analogous to the manner of application of the EBBE layers; and
- the entire assembly is machined to size using a Homag WIKI Vantage 43 CNC cutting machine armed with the Solid Carbide UN-ruffer 67-445 (½" dia) and the Solid Carbide Honeycomb Hogger.

Edge band 11 is applied using a Homag Edgebander and polyurethane (PUR) glue to form the composite component 20.

Whereas a specific embodiment is herein shown and described, variations are possible. For example:

- whereas a specific cutter is mentioned, other cutters, such as table saws, band saws and CNC routers can be utilized;
- whereas EBBE sheets are mentioned, other combinations can be utilized, provided that the thickness of each corrugated layer is at least about ⅜", which allows for edge banding;
- whereas a honeycomb layer of 0.5" is mentioned, thicknesses of up to 2.25" can be utilized;
- whereas a polyvinyl chloride (PVC) edge band is specifically mentioned, ABS and polypropylene can also be used;
- whereas polyurethane (PUR) glue is taught for use in edge banding, hot-melt EVA can also be utilized;
- whereas a pair of cover layers is shown, these are not essential;
- whereas PolyBak™ is specifically mentioned, other strong polymer saturated Kraft boards or papers can be used without sacrificing machinability; and
- whereas Renolit vinyl is mentioned, other standard general purpose laminates can be used.

One advantageous polyvinyl acetate (PVA) glue is Helmibond 816™, but other glues can be used. Advantages of using polyurethane (PUR) glue, for example, are that it sets quickly and can avoid or minimize the need for pressing. However, Helmibond 816™ was found to provide a hard glass-like surface upon curing, which provided a board that did not require special handling, that cut using conventional machinery without fraying [thereby requiring little or no sanding] and that could be edgetaped without being crushed using conventional edge taping machinery.

In one non-limiting example, for a composite board constructed in accordance with the present invention, when a rectangular sample of the composite 75" in length, 37¼" in width and 2" thick, when placed on the 75" edge, can support a 10,000 lbs force with a 1.6 inch deflection.

What is claimed is:

1. A composite comprising:
   a pair of corrugated layers, each corrugated layer comprising a pair of B flute layers bonded together and a pair of E flute layers each bonded to one of the B flute layers;
   a cardboard honeycomb disposed between and bonded to the corrugated layers, the honeycomb being orientated such that the cells extend between the corrugated layers; and
   for each corrugated layer, a backer layer overlying and bonded to said each corrugated layer and a cover layer overlying and bonded to the backer layer, the corrugated layers, the honeycomb, the backer layers and the cover layers collectively defining a board,
   wherein a rectangular sample of the composite 75" in length, 37¼" in width and 2" thick, when placed on the 75" edge, can support a 10,000 lb. force with 1.6" deflection.

2. A composite according to claim 1, wherein the corrugated layers are bonded to the honeycomb by polyvinyl acetate (PVA) glue.

3. The composite according to claim 1, wherein the E and B flute layers are bonded together with polyvinyl acetate (PVA) glue.

4. The composite according to claim 1, further comprising an edge band surrounding an edge of the board.

5. The composite according to claim 4, wherein the edge band is polyvinyl chloride (PVC) and is bonded to the board using polyurethane (PUR) glue.

* * * * *